April 13, 1948.   H. P. FINLEY   2,439,724
APPARATUS FOR MOLDING PIPE COVERINGS
Filed July 19, 1945   3 Sheets-Sheet 1

Inventor
HUGH P. FINLEY
By Rule and Hoge,
Attorneys

April 13, 1948.   H. P. FINLEY   2,439,724
APPARATUS FOR MOLDING PIPE COVERINGS
Filed July 19, 1945   3 Sheets-Sheet 2
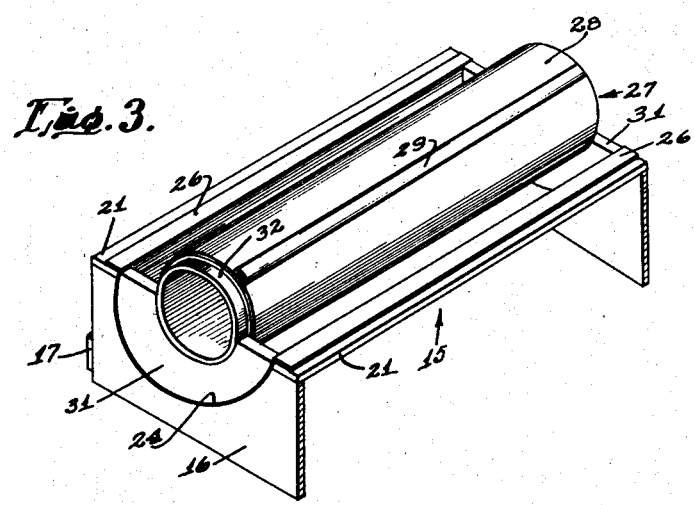
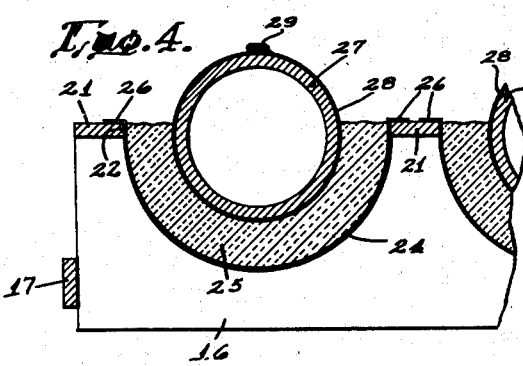
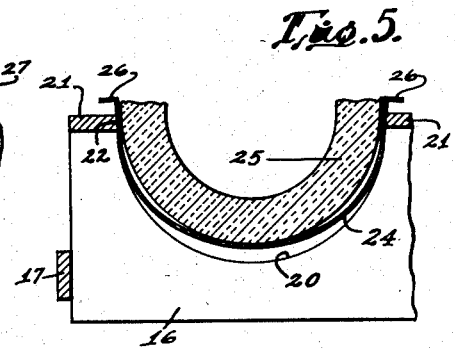
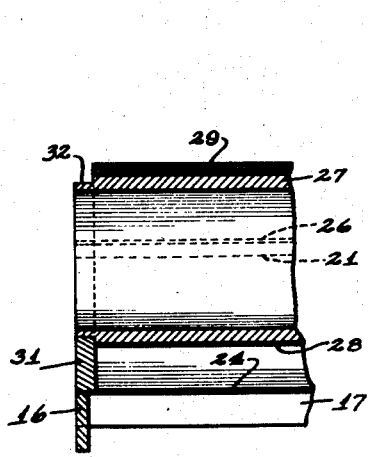
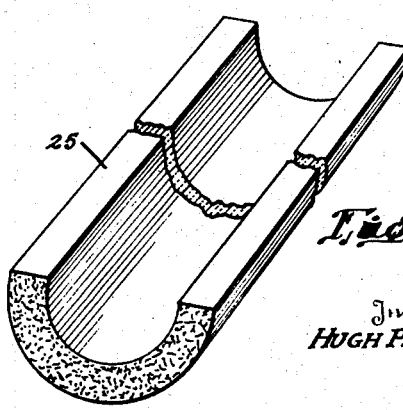
Inventor
HUGH P. FINLEY
By Rule and Hoge
Attorneys April 13, 1948.  H. P. FINLEY  2,439,724
APPARATUS FOR MOLDING PIPE COVERINGS
Filed July 19, 1945    3 Sheets-Sheet 3

Inventor
HUGH P. FINLEY
By Rule and Hoge
Attorneys

Patented Apr. 13, 1948

2,439,724

UNITED STATES PATENT OFFICE 2,439,724

APPARATUS FOR MOLDING PIPE COVERINGS

Hugh P. Finley, Berlin, N. J., assignor to Owens-Illinois Glass Company, a corporation of Ohio Application July 19, 1945, Serial No. 606,006

7 Claims. (Cl. 25—118)

1

My invention relates to an apparatus for molding material for use as coverings for pipes or other articles. The invention provides a method and apparatus by which hemicylindrical sections of material used for insulation or other purposes, are molded between a shell and core which shape the outer and inner surfaces respectively of the molded sections.

An object of the invention is to provide an apparatus in which the molding elements, including the outer shell and the core may be fabricated with ease and economy.

A further object of the invention is to provide a molding shell which may be reshaped with ease and economy to adapt it for variations in the size or shape of the molded sections.

A further feature of the invention relates to the provision of a molding shell made of light resilient metal, combined with a cradle in a manner to facilitate the stripping of the shell from the molded material.

A further object of the invention is to provide a construction in which a section of the pipe to be insulated, or of a standard pipe, may be used as a core in the molding operation, permitting the molded sections to be accurately formed and of the proper size for fitting such pipe.

A further feature of the invention relates to the means for providing the needed "overage" or clearance to accommodate the usual slight irregularities in the pipe surfaces to be covered, while insuring a good fit.

A further feature of the invention relates to the use of thin sheet metal or the like, both for forming an outer molding shell and for wrapping the molding core, thereby obtaining the various advantages incident to the use of such sheet material in the manner hereinafter set forth.

Other objects of the invention will appear hereinafter.

Referring to the accompanying drawings,

Fig. 3 is a perspective view of the molding elements in assembled relation, the frame being shown in cross-section.

Fig. 4 is a fragmentary cross-sectional view of the molding apparatus and molded material.

Fig. 5 is a view similar to Fig. 4 but with the core removed and showing the molded article being removed from the cradle.

Fig. 6 is a fragmentary section at the line 6—6 on Fig. 2.

2

Fig. 7 is a perspective view, with a portion broken away, of a molded section of pipe covering.

Figure 8:
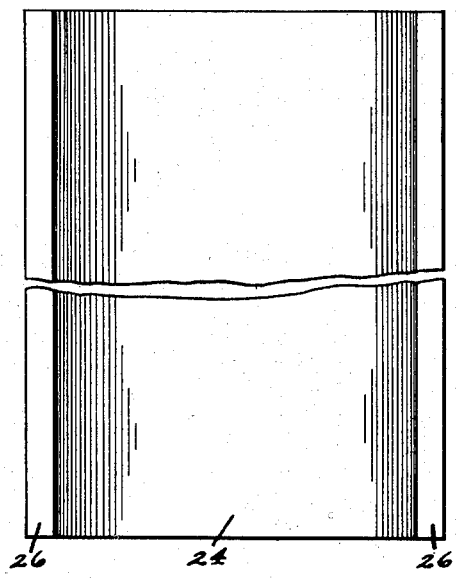

Fig. 8 is a plan view of the outer shell, a portion being broken away.

Figure 9:
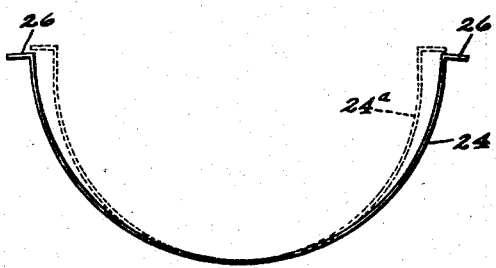

Fig. 9 is an end view of the shell.

Figure 10:
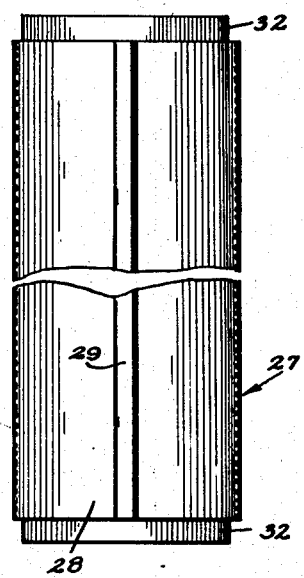

Fig. 10 is a plan view of the core with a portion broken away.

Figure 11:
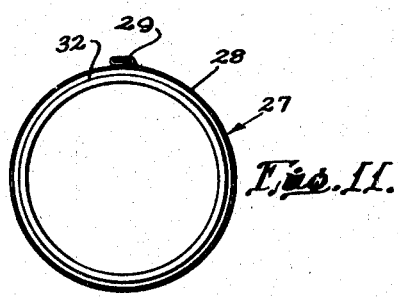

Fig. 11 is an end view of the same.

Figure 12:
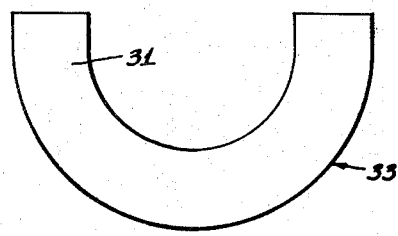

Fig. 12 is an elevation view of a spacer.

Figure 13:

Fig. 13 is an edge view of the same.

Figures 1, 2:
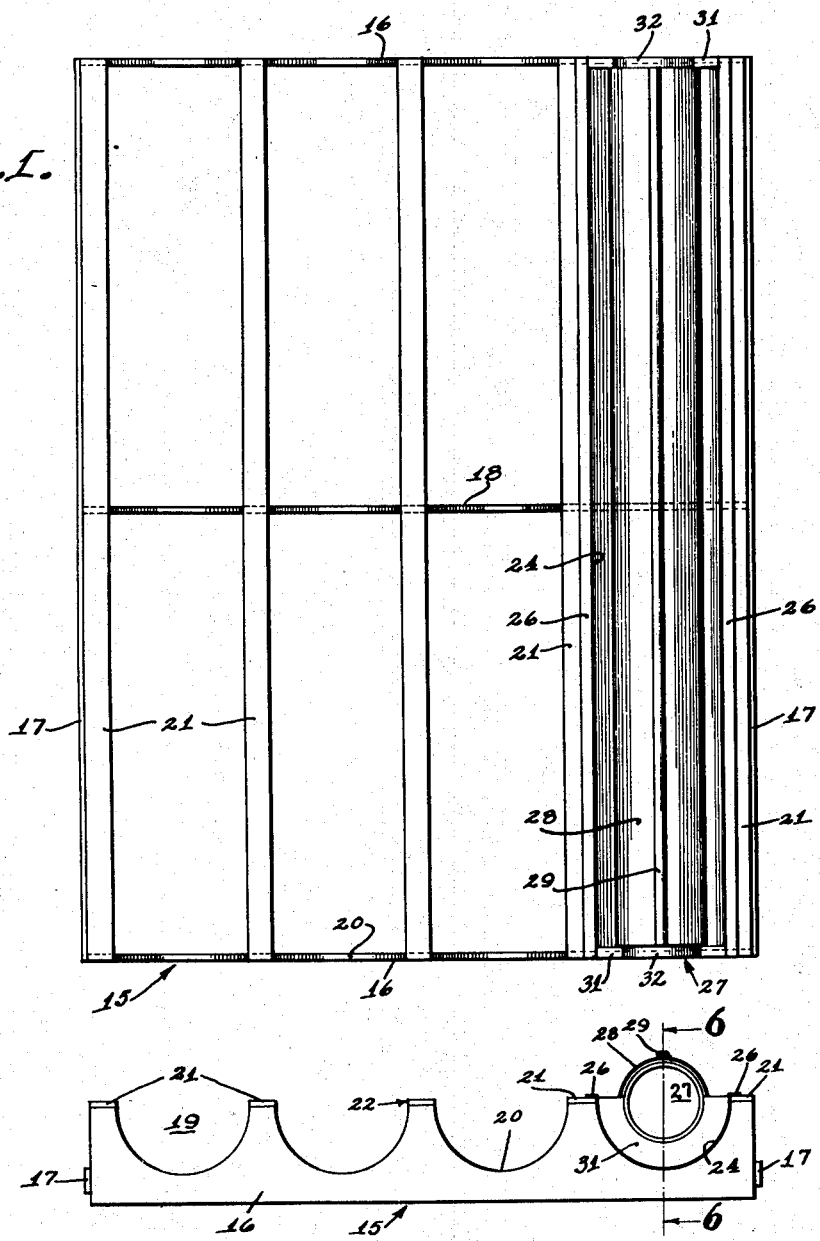
Fig. 1 is a plan view of a frame or multiple cradle with a molding core and spacers assembled with one cradle section.
Fig. 2 is an end elevational view of the same.

Referring particularly to Figs. 1 and 2, the frame 15 or cradle comprises end plates 16 and side bars 17 rigidly uniting the end plates and holding them in an upright, or vertical position. The frame may also include one or more intermediate plates 18. The end and intermediate plates 16 and 18 have semi-circular sections cut away to provide recesses 19 with semi-circular bearing surfaces 20. The recesses 19 are spaced at short distances apart and longitudinal bars 21 of steel or the like, extending lengthwise of the frame, are secured to the members 16 and 18. The bars 21 are of the same width as the spacing between said recesses, the side edge surfaces 22 of the bars being flush with the surfaces 20. That is, the surfaces 22 are in the vertical planes tangent to the curved surfaces 20.

The molding elements for molding the outer semi-circular surfaces of the pipe cover sections 25 (Fig. 7) consist preferably of resilient sheet metal or other resilient material. The body of the molding element is approximately semi-cylindrical and is formed along its upper edges with out-turned horizontal flanges 26. The shells 24 are of a size, shape and curvature corresponding to the recesses 20 so that the shells accurately fit within said recesses when placed in molding position. The sides of the shells extend vertically upward beyond the top surfaces of the end plates 16, in contact with the surfaces 22 of the strips 21, the flanges 26 being seated on the upper surfaces of said strips. The center of curvature of the shell when in assembled position is preferably substantially in the horizontal plane of the lower surfaces of the bars 21.

Referring to Fig. 9, the shell 24, made of resilient sheet metal, has a bias which causes the shell to spread when released from its cradle. That is, when the shell is free, the sides thereof spring outwardly from the dotted line contour 24ª to which it is held in the cradle, to the full line position. The shell is thus held under tension while in molding position which tends to hold it in place in the cradle and, when removed from the cradle, facilitates the separation of the shell from the molded article.

The cores for molding the inner surfaces of the pipe covering sections 25 may consist of pipe sections 27 about equal in length to the frame 15. Each core may be a section of a pipe of the standard size to which the pipe covering sections are to be applied so that the latter are molded accurately to the required size. In order to mold the inner surfaces of the material on a slightly larger radius than that of the pipe to be covered thereby, thus making allowance for the usual slight irregularities in the pipe surface, one or more layers of sheet metal or other material 28 are wrapped around the pipe or core 27. The sheet material is drawn tightly around the core and the edges of the sheet fastened together in a seam 29.

The core 27 is spaced from the shell 24 and held in the frame in a position concentric with the shell by means of spacers 31, each being substantially semiannular in form. The spacing strips 31 are secured to the cores 27 either by welding or other attaching means. The cores 27 may be formed with end portions 32 of reduced diameter for receiving the spacing strips. The outer edges 33 of the spacing strips have the same radius of curvature as the inner surface of the shells 24 into which they fit when assembled for the molding operation.

In operation the shells 24 are first assembled with the cradle frame 15. The cores 27 with the attached spacers 31 are then placed in position, the spacers serving to hold the sheet metal shells seated on the supporting bars 21 and also maintaining the correct curvature of the shells. The slurry, or other material to be molded, is then poured or placed in the mold cavity provided between the shell and core and may be screeded along the open slots between the strips 21 and the cores. This may leave the upper surface of the molded material a short distance above the horizontal diameter of the cores 27. Induration of the molded material may be effected in an autoclave or by other means depending on the material being molded. After the material has set, the cores with their spacing strips may be removed. Further processes may be carried on if desired while the molded material remains in the shells 24. As an alternative method, the cores may be removed, and then the molded sections together with the shells 24 may be lifted from the frame and the molded sections placed on a pallet or the like for additional processing. The molded sections may be trimmed down along their upper surfaces to the level of the axis of curvature.

Referring to Fig. 5 which shows a molded pipe covering section being lifted from the frame, it will be seen that the shell 24 as it is moved upwardly tends to spread laterally owing to its inherent resiliency, thereby reducing its area of contact with the molded section to a comparatively small area, theoretically to a line. This facilitates the removal entirely of the molded section from the shell.

Modifications may be resorted to within the spirit and scope of my invention.

I claim:

1. Apparatus for molding pipe covering sections of hemicylindrical form, comprising a hemicylindrical shell, a frame in which the shell is supported with the axis of the shell extending horizontally and the body of the shell below said axis, a cylindrical core of smaller diameter than said shell, semi-annular spacing members having a fixed connection with the core adjacent the ends thereof, said spacing members being seated in said shell and shaped to hold the core in a position concentric with the shell, said shell, core, and spacing members together forming a hemicylindrical mold cavity of which the shell and core form respectively the outer and inner semicylindrical wall surfaces and the spacing members form the end surfaces, the said mold cavity being open between the core and the rim of the shell to receive the molding material, the core and spacing members being free to be lifted as a unit from the shell and the molded article therein.

2. Apparatus for molding pipe covering sections of hemicylindrical form, comprising a hemicylindrical shell, a frame in which the shell is supported with the axis of the shell horizontal and the body of the shell below the horizontal plane of said axis, a cylindrical core of smaller diameter than said shell, semi-annular spacing members having a fixed connection with the core adjacent the ends thereof, said spacing members being seated in said shell and shaped to hold the core in a position concentric with the shell, and a layer of sheet material surrounding the core, said shell, core with its said surrounding layer of sheet material, and spacing members together forming a hemicylindrical mold cavity of which the shell and said sheet material form respectively the outer and inner semicylindrical wall surfaces and the spacing members form the end surfaces, said mold cavity being open throughout its length at both sides of the core to receive the molding material, said core and spacing members being free to be lifted as a unit from the shell and molded article while the latter retains its position within the shell.

3. Apparatus for molding pipe covering sections of hemicylindrical form, said apparatus comprising a cradle having upright end plates formed with semicircular recesses, a sheet metal shell of substantially hemicylindrical form seated in the cradle and fitted in said recesses, said shell having its axis horizontal and the rim of the shell approximately in the horizontal plane of said axis, a tubular core, spacers attached to the core adjacent to the ends thereof, said spacers being seated within the shell and bridging the space between the core and shell and thereby forming end walls of the mold cavity, said spacers being shaped to hold the core concentric with the shell, the mold cavity being open at said horizontal plane to receive molding material, and the core and spacers being free to be lifted as a unit from the shell and the molded article therein while the said article retains its position in the shell.

4. Apparatus for molding pipe covering sections of hemicylindrical form, comprising a cradle having vertical end walls with horizontal top edges, and spaced parallel longitudinal horizontal bars supported on and attached to said edges, the end walls being formed with semicircular recesses having their diameters substantially in the horizontal plane of said edges, a hemicylindrical shell seated in said end walls and fitting said recesses, said shell having longitudinal flanges extending along and seated on said bars, a cylindrical core of smaller diameter than the shell, spacers attached to the core and seated in the shell, said spacers being positioned and shaped to hold the core concentric with the shell and bridging the space between the core and shell and thereby forming end walls for the mold cavity, said shell, core, and spacers forming a hemicylindrical mold cavity open along the sides of the core to receive molding material, said core being free for lifting from the shell and the molded article therein when the molding material has set, while the shell with the said article therein remains in said seated position in the cradle.

5. Apparatus for molding pipe covering sections of hemicylindrical form, comprising a cradle having vertical end walls with horizontal top edges, and spaced parallel longitudinal horizontal bars supported on and attached to said edges, the end walls being formed with semicircular recesses having their diameters substantially in the horizontal plane of said edges, a hemicylindrical shell seated in said end walls and fitting said recesses, said shell having longitudinal flanges extending along and seated on said bars, a cylindrical core of smaller diameter than the shell, spacers attached to the core and seated in the shell, said spacers being positioned and shaped to hold the core concentric with the shell and bridging the space between the core and shell and thereby forming end walls for the mold cavity, and a sheet of metal wrapped around the core and having its edges fastened together in a seam extending lengthwise of the core, said shell, core and sheet metal wrapping, and spacers forming a hemicylindrical mold cavity open along the opposite sides of the core to receive molding material, the core with its wrapping and attached spacers being free to be lifted from the shell and the molded article when the molded material has set, while the shell with the said articles therein remains in said seated position in the cradle.

6. An apparatus for molding covering sections of hemicylindrical form, said apparatus comprising a frame having upright end plates with horizontal upper edge surfaces and formed with semicylindrical recesses at intervals therealong, said recesses having their diameters substantially in the plane of said edge surfaces and being spaced apart with short sections of said edge surfaces therebetween and between the ends of the said end walls and the adjoining recesses, said frame comprising horizontal bars seated on said edge surfaces, hemicylindrical shells having the same radius or curvature as said recesses and supported therein, said shells having longitudinal out-turned flanges seated on said longitudinal bars, cylindrical cores individual to and of smaller diameter than said shells, and semi-annular spacers attached to the cores adjacent to the ends thereof and fitting in said shells, said spacers being shaped and positioned to hold the cores concentric with the shells and providing end walls for the mold cavities, each shell with its associated core and spacers forming a hemicylindrical mold cavity open along both sides of the core to receive molding material, the cores being free to be lifted individually from the respective shells and the molded articles therein when the molded material has set, while the shell with the article therein remains seated in the cradle.

7. An apparatus for molding covering sections of hemicylindrical form, said apparatus comprising a frame having upright end plates with horizontal upper edge surfaces and formed with semicylindrical recesses at intervals therealong, said recesses having their diameters substantially in the plane of said edge surfaces and being spaced apart with short sections of said edge surfaces therebetween and between the ends of the said end walls and the adjoining recesses, said frame comprising horizontal bars seated on said edge surfaces, hemicylindrical shells having the same radius or curvature as said recesses and supported therein, said shells having longitudinal out-turned flanges seated on said longitudinal bars, cylindrical cores individual to and of smaller diameter than said shells, and semi-annular spacers attached to the cores adjacent to the ends thereof and fitting in said shells, said spacers being shaped and positioned to hold the cores concentric with the shells and providing end walls for the mold cavities, each shell with its core and spacers being free to be lifted from the frame after a said section of covering material has been molded and hardened therein, the shell being formed of resilient sheet metal having a bias by which the sides thereof are caused to spring apart as the shell is lifted, thereby freeing the shell from the molded material, each core with its spacers being free to be lifted from the shell and molded article therein independently of the relative position of the shell and frame.

HUGH P. FINLEY.

REFERENCES CITED

The following references are of record in the file of this patent:

UNITED STATES PATENTS

| Number | Name | Date |
|---|---|---|
| 696,686 | Lyons | Apr. 1, 1902 |
| 895,691 | Scott | Aug. 11, 1908 |
| 1,049,352 | Fleming | Jan. 7, 1913 |
| 2,239,195 | Henderson | Apr. 22, 1941 |